United States Patent
Lu

(10) Patent No.: US 6,647,246 B1
(45) Date of Patent: Nov. 11, 2003

(54) APPARATUS AND METHOD OF SYNCHRONIZATION USING DELAY MEASUREMENTS

(75) Inventor: Chun Chian Lu, Hsinchu (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/479,994

(22) Filed: Jan. 10, 2000

(51) Int. Cl.$^7$ .......................... H04B 17/00; H04Q 7/20
(52) U.S. Cl. ............................ 455/67.11; 455/67.14; 455/67.16; 455/69; 455/423; 342/375
(58) Field of Search ................ 455/67.1, 67.6, 455/67.4, 423–425, 500, 502; 375/356; 370/350, 507; 342/375

(56) References Cited

U.S. PATENT DOCUMENTS

| | | | | |
|---|---|---|---|---|
| 4,587,382 A | * | 5/1986 | Yang ........................ | 179/170.2 |
| 4,845,735 A | * | 7/1989 | Payne et al. .................... | 379/5 |
| 5,280,629 A | * | 1/1994 | Lo Galbo et al. .......... | 455/51.2 |
| 5,453,015 A | * | 9/1995 | Vogel ........................ | 434/350 |
| 5,959,568 A | * | 9/1999 | Woolley ..................... | 342/42 |
| 5,974,057 A | * | 10/1999 | Rozanski, Jr. et al. ...... | 370/519 |
| 6,011,974 A | * | 1/2000 | Cedervall et al. ........... | 455/456 |
| 6,278,868 B1 | * | 8/2001 | Fensch ....................... | 455/260 |

* cited by examiner

*Primary Examiner*—William Trost
*Assistant Examiner*—Meless Zewdu
(74) *Attorney, Agent, or Firm*—Finnegan, Henderson, Farabow, Garrett & Dunner, L.L.P.

(57) ABSTRACT

This invention pertains in general to a method of synchronizing remote stations in a communications system and, more particularly, to a method for measuring delay between two remote stations in a communications system. A method of measuring delay between a first station and a second station in different localities in a communications system that includes transmitting a first signal from the first station to the second station and simultaneously resetting a counting clock in the first station, receiving a delayed first signal at the second station, transmitting the delayed first signal to the first station, receiving a further delayed first signal at the first station and simultaneously stopping the counting clock, calculating the number of counts elapsed in the counting clock between the resetting and the stopping of the counting clock, wherein each count of the counting clock equals the period of the counting clock, and multiplying the number of counts with the period of the counting clock.

34 Claims, 2 Drawing Sheets

APPARATUS AND METHOD OF SYNCHRONIZATION USING DELAY MEASUREMENTS

BACKGROUND OF THE INVENTION

1. Field of the Invention

This invention pertains in general to a method of synchronizing remote stations in a communications system and, more particularly, to a method for measuring delay between two remote stations in a communications system.

2. Description of the Related Art

Clock synchronization for stations at different localities with that of a central reference clock is required for many communications systems, such as synchronization of satellite clocks in a global positioning satellite ("GPS") system, and synchronization of base stations and handsets in a Time Division Multiple Access ("TDMA") or a Code Division Multiple Access ("CDMA") cellular system. In the absence of an ideal clock, e.g., an atomic clock, synchronization is difficult to achieve without delay measurements.

For many cellular systems, such as the IS-95, CDMA2000, both developed by Qualcomm, Inc., and the Digital Enhanced Cordless Telephone ("DECT") system of the European Telecommunication Standards Institute ("ETSI") standard, various methods have been proposed, including using the GPS system, making delay measurements through echo detection, and achieving synchronization using Integrated Services Digital Network ("ISDN") or High-Data-Rate Digital Subscriber Line ("HDSL") interfaces aided by delay measurements to achieve base station synchronization. Each method has its merits and drawbacks.

GPS is accurate and stable but GPS signals cannot be detected indoors. Delay measurements through echo detection require a wire or a finite bandwidth for synchronization at the time of measurement. This measurement is not a simple peak detection task but rather a signal processing task requiring certain factors to be taken into consideration, such as severe distortion and noises. Furthermore, it is difficult to embed a delay measurement mechanism in an existing interface without having to redesign it. The third method of using synchronous data interfaces appears to be cost-effective because interfaces are already available in wireless communications systems. However, the algorithms implemented require a separate apparatus to measure an absolute delay.

In addition to base station synchronization, handset synchronization is also desirable for improving CDMA and TDMA systems. Base station and handset synchronization would also reduce the delay spread of handset frames at the base station. To achieve synchronization, delay measurement between the base station and the handset would be required. Synchronous CDMA systems are proposed to reduce interference and simplify implementation in a multi-user environment. Currently, uplink synchronous transmission scheme is an alternative technology in the third generation wide band CDMA standard.

The DECT system was designed for micro-cells, each cell having a base station. A synchronous DECT can also operate in large cells as may be required in a wireless local loop ("WLL"), where the handset to base station distance may be greater than 10 Km. However, according to interference calculations with the DECT design specifications, the system breaks down when frame synchronization from the handset is off by 11 microseconds. If the base stations are synchronized and the only source of timing error is due to air propagation delay difference between the nearest handset and the most-distant handset to the common base station, the largest cell radius is approximately 3 Km. In a 7-cell cluster, for example, there would require a central controller, and the maximum radius would be approximately 9 Km. This assumes the ideal case where the base station is only responsible for the handset in the cell. In a real fading environment where dynamic channel allocation prevails, the real radius of the DECT 7-cell cluster must be smaller than 9 Km because the delay spread may be as large as the diameter of the cluster. Therefore, handset synchronization is as important as base station synchronization in larger cells in a WLL using DECT or any other type of TDMA scheme.

SUMMARY OF THE INVENTION

Accordingly, the present invention is directed to a method for synchronizing two remote stations in a communications system that substantially obviates one or more of the problems due to limitations and disadvantages of the related art.

To achieve these and other advantages, and in accordance with the purpose of the invention as embodied and broadly described, there is provided a method of measuring delay between a first station and a second station in a communications system, wherein the distance between the first station and the second station is more than negligible. The method includes transmitting a first signal from the first station to the second station and simultaneously resetting a counting clock in the first station, receiving a delayed first signal at the second station, transmitting the delayed first signal to the first station, receiving a further delayed first signal at the first station and simultaneously stopping the counting clock, calculating the number of counts elapsed in the counting clock between the resetting and the stopping of the counting clock, wherein the duration of each count of the counting clock equals the period of the counting clock, and multiplying the number of counts with the period of the counting clock to obtain the delay.

In one aspect of the invention, the simultaneously resetting a counting clock includes providing a first clock to reset the counting clock, wherein the first clock has a period equal to or greater than the delay between the first station and the second station.

In another aspect of the invention, the first station includes a first transceiver transmitting the first signal to the second station and providing the first clock signal to reset the counting clock.

In yet another aspect of the invention, the simultaneously stopping the counting clock comprises providing a second clock to stop the counting clock, wherein the second clock has a preferred period equal to the first clock.

As a preferred option the simultaneity in resetting and stopping is realized by using the rising or falling edge of input clock signals. Therefore, the preferred implementation of the signals is the rising or the falling edges of the clocks.

In still another aspect of the invention, the method further includes receiving at a third transceiver, coupled to a fourth transceiver in the second station, the delayed first signal from the first station and the fourth transceiver transmitting the delayed first signal to the first station.

Also in accordance with the present invention, there is provided a method of measuring delay between a first interface pair and a second interface pair in a communications system, wherein the first interface pair includes a first interface and a second interface and the second interface pair includes a third interface and a fourth interface, and wherein the distance between the first interface pair and the second interface pair is more than negligible. The method includes transmitting a first signal from the first interface and simultaneously providing a first clock signal to reset a counting clock, receiving a delayed first signal at the third interface, transmitting the delayed first signal from the fourth interface, wherein the distance between the third interface and the fourth interface is negligible, receiving a further delayed first signal at the second interface, and simultaneously stopping the counting clock, calculating the number of counts elapsed in the counting clock between the resetting and the stopping of the counting clock, wherein each count of the counting clock equals the period of the counting clock, and multiplying the number of counts with the period of the counting clock.

In one aspect of the invention, the method also includes applying delay locking to the first signal.

Further in accordance with the present invention, there is provided a method of synchronizing a handset to a base station in a wireless communications system that includes transmitting a first signal from the base station and simultaneously resetting a counting clock in the base station, receiving a delayed first signal at the handset, transmitting the delayed first signal from the handset, receiving a further delayed first signal at the base station and simultaneously stopping the counting clock, calculating the number of counts elapsed in the counting clock between the resetting and the stopping of the counting clock, wherein each count of the counting clock equals the period of the counting clock, and multiplying the number of counts with the period of the counting clock.

In one aspect of the invention, there includes repeating a predetermined number of repetitions of the calculating of the number of counts and adding the number of counts for the predetermined number of repetitions to obtain a sum, and dividing the sum by the predetermined number of repetitions to get the average count.

Further in accordance with the present invention, there is provided a method of synchronizing a first station with a second station in a communications system, wherein the distance between the first station and the second station is more than negligible that includes providing a first interface in the first station, the first interface transmitting a first signal and simultaneously providing a first clock signal to reset a counting clock in the first station, providing a second interface in the first station, providing a third interface in the second station, the third interface receiving a delayed first signal and transmitting the delayed first signal, providing a fourth interface coupled to the third interface in the second station, the fourth interface receiving the delayed first signal and transmitting the delayed first signal, wherein the distance between the third interface and the fourth interface is negligible, receiving a further delayed first signal at the second interface, and simultaneously stopping the counting clock, providing a counter to determine the number of counts elapsed in the counting clock between the resetting and the stopping of the counting clock, wherein each count of the counter equals the period of the counting clock, and multiplying the number of counts with the period of the counting clock.

In one aspect of the invention, the method also includes providing the first interface as a U-transceiver.

In another aspect of the invention, the method includes providing the first interface and the second interface as a master-slave pair.

Additionally in accordance with the present invention, there is provided a communications system that includes a first station transmitting a first signal and resetting a counting clock in the first station, a second station receiving a delayed first signal from the first station and transmitting the delayed first signal to the first station, the first station simultaneously stopping the counting clock upon receiving a further delayed first signal from the second station, wherein the distance between the first station and the second station is more than negligible, a counter coupled to the first station to determine the number of counts elapsed in the counting clock between the resetting and the stopping of the counting clock, wherein each count of the counter equals the period of the counting clock, and arithmetic means coupled to the counter for multiplying the number of counts with the period of the counting clock.

In one aspect of the invention, the first station is a base station.

In another aspect of the invention, the second station is a handset.

Still in accordance with the present invention, there is provided an apparatus for delay measurements that includes a first interface pair including a first interface and a second interface, the first interface transmitting a first signal and simultaneously resetting a counting clock, a second interface pair including a third interface and a fourth interface, the third interface receiving a delayed first signal from the first interface, and the fourth interface transmitting the delayed first signal to the second interface, wherein the distance between the third interface and the fourth interface is negligible, the second interface receiving a further delayed first signal and simultaneously stopping the counting clock, a counter coupled to the first interface pair to calculate the number of counts elapsed in the counting clock between the resetting and the stopping of the counting clock, wherein each count of the counting clock equals the period of the counting clock, and arithmetic means for multiplying the number of counts with the period of the counting clock.

Additional features and advantages of the invention will be set forth in the description which follows, and in part will be apparent from the description, or may be learned by practice of the invention. The objectives and other advantages of the invention will be realized and attained by the structures and methods particularly pointed out in the written description and claims thereof, as well as the appended drawings.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention. In the drawings.

DETAILED DESCRIPTION OF THE PREFERRED EMBODIMENTS

Figure 1:
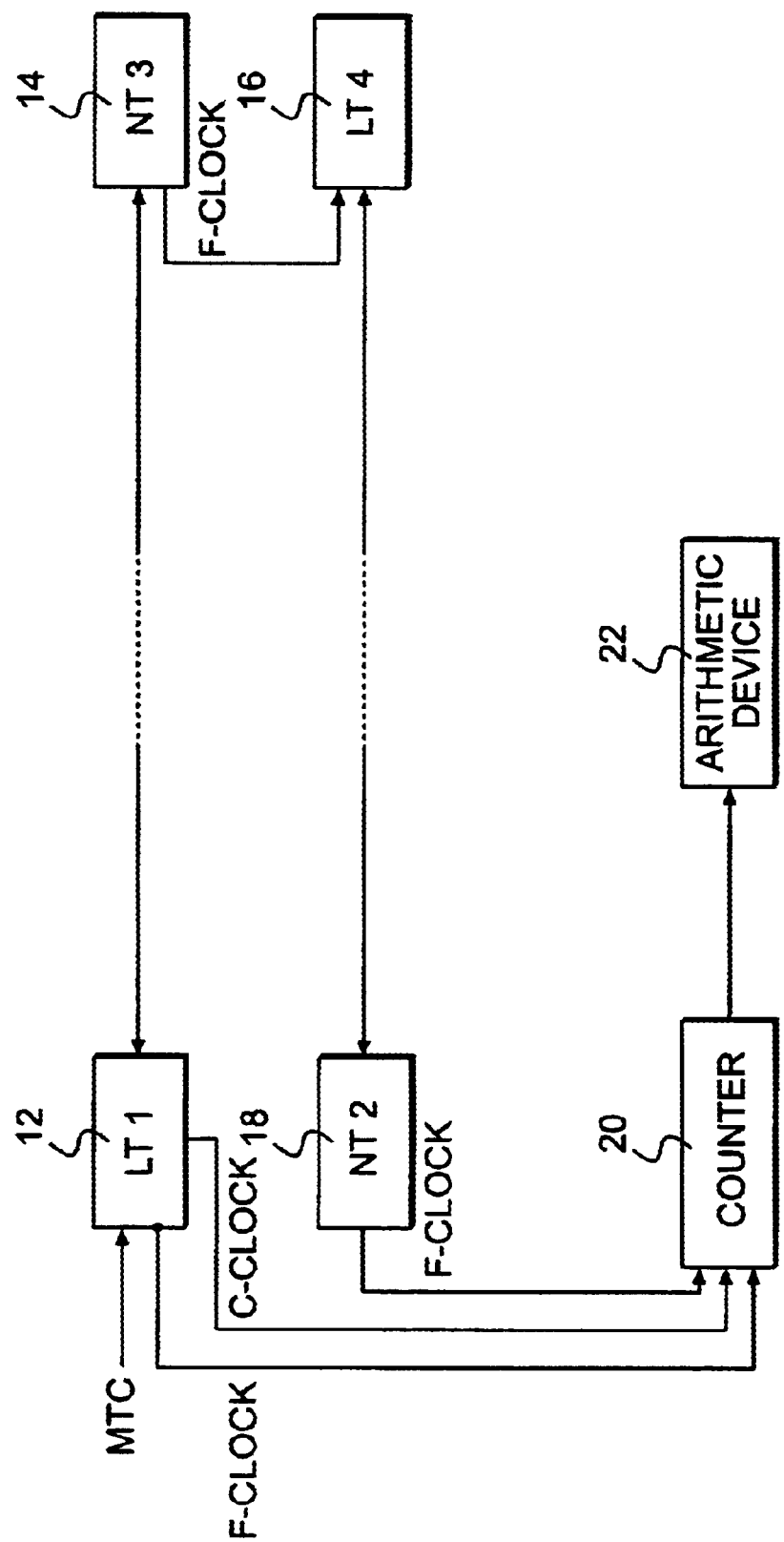
FIG. 1 is a block diagram showing one embodiment of the present invention in a wired environment.

Embodiments consistent with the present invention include a method for synchronizing transmission of remote stations in a communications system using existing components, such as U-interfaces and air interfaces. The method includes transmitting a first signal from a first station to a second station and simultaneously resetting a counting clock in the first station. The distance between the first station and the second station is more than negligible, i.e., more than a few hundred meters. The second station then receives a delayed first signal and then transmits the delayed first signal to the first station. The delayed first signal is phase locked to the first signal. After the first station receives a further delayed first signal, the counting clock is stopped. The total delay between the first station and the second station may be determined by calculating the number of counts elapsed between resetting and stopping of the counting clock, wherein each count of the clock equals the period of the counting clock, and then multiplying the number of counts with the period of the counting clock. The delay between the first station and the second station may further be obtained by dividing the result of the multiplication by two.

Specifically applied, embodiments consistent with the present invention are directed to a method of measuring time delay between two transceivers in two remote stations using existing interfaces, such as wired ISDN or HDSL interfaces and wireless CDMA or TDMA air interfaces. These interface transceivers, such as U-transceivers in an ISDN system, generally are connected in pairs with a master transceiver ("MT") and a slave transceiver ("ST"). The MT clock is synchronized to an independent master timing clock ("MTC") and the ST derives its clock from the MT. The ST clock is therefore delayed in proportion to the distance between the MT and ST.

In addition, each of these transceivers has two clock outputs, a fast clock and a slow clock. For a U-transceiver specifically, the fast clock is also known as a "C-clock," and the slow clock is also known as a frame clock, or "F-clock." Each frame of the frame clock is set at an 8 KHz rate. When two pairs of transceivers are connected to form a loop so that the MT of the first pair is next to the ST of the second pair, the MT of the second pair uses the slow clock of the first pair as its MTC. The slow clock of the first pair is set to the original MTC. The delay between the first transceiver pair and the second transceiver pair can be measured with a counter next to the MTC of the first pair together with a counter clock.

The counter clock, driven by the fast clock of the MT of the first pair, is reset or started by the slow clock, or original MTC, of the MT of the first pair and stopped or held by the slow clock of the ST of the second pair. The round-trip delay between the transceivers of the first pair and the transceivers of the second pair is determined as the count value multiplied by the period of the fast clock. In other words, the round-trip delay may be obtained by dividing the count value by the frequency of the fast clock. The single-trip delay between the transceivers of the first pair and the transceivers of the second pair may be determined by dividing the round-trip delay by two.

In one embodiment of the present invention, the transceivers of the first pair may be disposed inside of and represent a central controller, and the transceivers of the second pair may be disposed inside of and represent a base station in a wired communications system. The delay between the central controller and the base station may be measured by transmitting a first signal from the central controller to the base station and simultaneously resetting a counting clock in the central controller. Because the central controller and the base station are in different localities, the first signal is delayed when it is received by the base station. The delayed first signal is then transmitted to the central controller, so that the first signal is further delayed and received by the central controller. Simultaneously with the receipt of the further delayed first signal, the counting clock is stopped. The delay between the central controller and the base station may be determined by calculating the number of counts elapsed in the counting clock between resetting and stopping, and multiplying the number of counts with the period of the counting clock. Each count of the counting clock equals the period of the counting clock. The delay between a base station and a handset in a wireless system may likewise be measured.

However, determination of the time delay requires a "window of certainty," which defines the largest scale for the measurement of interest, or the minimum to the maximum distance to be measured. The "window" ensures any measurement that falls into this window is unambiguous such that a suitable scale of measurement may be defined. Therefore, the delay to be measured must be less than the period of the slow clock of the MT of the first pair, and the window of certainty is set to equal the period of the slow clock.

Delay<MTC slow clock period

Thus, the slow clock may be set according to the size of the system, a known parameter for each system, and prior to the operation of the system. After the slow clock is set, a finer scale set by the fast clock can be defined accordingly. These clocks are mutually synchronous and their accuracy is determined by the fast clock, which determines the accuracy of delay measurements.

Specifically for the DECT and CDMA systems, more than two pairs of ISDN interfaces are used, specifically U-transceivers, to carry data and commands between the base station and the central controller because the required operational bandwidth is greater than 160 kbps, the bandwidth for each U-transceiver. In addition, each U-transceiver may operate in a master mode ("LT") or a slave mode ("NT") in an ISDN system. In the LT mode, the U-transceiver uses an external master timing clock ("MTC") for reference and synchronizes its clocks to the MTC. In the NT mode, the U-transceiver synchronizes its clocks to the received signal from the LT transceiver.

When the NT and LT transceivers are in remote locations, the NT clocks are delayed from the MTC.

FIG. 1 is a block diagram showing one embodiment of the present invention in a wired environment. Referring to FIG. 1, a wired communications system 10 includes a first U-transceiver 12 that operates in the LT mode (hereinafter referred to as "LT1"), a second U-transceiver 14 that operates in the NT mode (hereinafter referred to as "NT3"), a third U-transceiver 16 that operates in the LT mode (hereinafter referred to as "LT4"), and a fourth U-transceiver 18 that operates in the NT mode (hereinafter referred to as "NT2"). NT3 and LT4 are in a remote location from LT1 and NT2. In wired communications system 10, NT3 and LT4 may represent a base station and LT1 and NT2 may represent the central controller, or vice versa, and the distance between the base station and the central controller is more than negligible, i.e., more than a few hundred meters. If the distance between a base station and the central controller is negligible, delay measurements may not be required as any propagation delay between the central controller and the base station would be negligible. However, frame synchronization is still necessary because free running clocks will eventually be out of sync.

LT1 receives an external MTC, and provides two output clocks, a fast clock (C-clock), and a slow clock (F-clock). NT3 provides an output clock, F-clock, and NT2 provides an output clock, F-clock. When a signal is transmitted at time t in MTC time from LT1, the time of arrival at NT3 is t+D, where D is the propagation delay. The t+D time is the measured time at NT3 if its clock is synchronous with that However, delay D cannot be determined because t and D are two unknown parameters at NT3. Conventional systems ignore the delay, assuming its value to be negligible. Such an assumption, however, may not be feasible in big systems where the signal delay must be taken into consideration.

LT4 is coupled to the NT3, and NT2 is provided adjacent to the LT1. LT4 is coupled to the NT2. LT4 uses the F-clock of NT3 as its MTC. Also, the distance between LT4 and NT3 must be negligible to ensure that the MTC of LT4 is phase or delay locked to the master MTC. LT4 and NT2 possess normal functions of U-transceivers as data interfaces between the central controller and the base station. These connections form a closed circuit. A timing signal transmitted from LT1 at t will return to NT2 at t+2D. At LT1, two measurements are available, t and t+2D, and therefore D may be determined explicitly. As described earlier, for unambiguous measurement of the delay, the period of the slow clock, F-clock, must be greater than or equal to the delay D.

To measure the delay, two F-clocks are provided to reset and stop a counting clock (fast clock or C-clock) that measures the number of counts between resetting and stopping. Specifically, at t, LT1 transmits a timing signal to NT3 and simultaneously provides its F-clock to reset the counting clock provided to drive a counter 20. NT3 receives the delayed timing signal at t+D. NT3 then transmits the delayed timing signal to LT4. Because the distance between NT3 and LT4 is negligible, there would only be an additional negligible delay, if any, when the delayed timing signal is received by LT4. LT4, in turn, transmits the delayed timing signal to NT2. The further delayed timing signal is received by NT2 at t+2D, and NT2 simultaneously provides its F-clock to stop the counting clock.

Counter 20 receives the F-clock and C-clock from LT1 and the F-clock from NT2, and indicates the number of counts elapsed between the resetting and stopping of the counting clock. An arithmetic device 22 calculates the round-trip time delay by dividing the count value by the frequency of the fast clock, or multiplying the count value with the period of the fast clock, C-clock. This value may then be divided by two to obtain the single-trip delay between LT1 and NT3, or between the central controller and the base station.

The present invention may also be applied to the DECT system for base station synchronization. The rate of F-clock output of LT1 at the central controller equals the MTC frequency of 8 KHz. Accordingly, the period of the F-clock is 125 microseconds. It is known that the propagation delay in the largest 9 Km radius cluster is 45 microseconds. Therefore, the period of the F-clock is greater than the delay D and the window of certainty is defined. In addition, a U-transceiver achieves better than a $10^{-7}$ Bit Error Rate ("BER") over 3.6 Km of 26 AWG cable. This is longer than the normal distance between the central controller and base stations of the current DECT multi-cell cluster. Nevertheless, when the distance is longer than 3.6 Km, more LT-NT pairs can be added to the closed loop for delay measurements.

The present invention may also be applied to base station and handset synchronization in a cellular system. Referring again to FIG. 1, in the instance of a cellular system, the transceivers operating in the master mode would now be transmitters and the transceivers operating in the slave mode would now be receivers. Transceivers 12 and 18 would represent the base station and transceivers 14 and 16 would represent the handset. Other modifications include defining two clocks and adding a counter, both of which may be implemented in software. Also in a wireless system, there would not be any wire connections between transceivers 12 and 14, and between transceivers 16 and 18. The delay between the base station and the handset may be measured consistent with that of a wired system in the manner already described.

Specifically regarding the IS-95 or CDMA2000 system, base stations are synchronized as already described. The pilot and sync channels from the base station carry an implicit master (system) timing clock. After initial acquisitions, a delay lock loop ("DLL") begins at the base station and the handset. These are well known techniques in the CDMA system. The handset derives its clock from the delayed MTC, and then transmits the reverse burst to ensure that the transmitted MTC is coherent to the received MTC, a function of the DLL. To measure the delay D, the base station may employ counter 20 to track the number of counts elapsed between the resetting and stopping of the counting clock. In this embodiment, the sampling clock of the CDMA system represents the counting clock. The handset movement is tracked by the continuous DLL at the base station and handset.

In the instance of a wireless DECT system where the transceivers are air interfaces, each frame of the up and down link contains a sync word, equivalent to that of a U-transceiver in an ISDN system and the pilot in the CDMA system. The base station and handset acquire and track this sync word to time their clocks. In other words, the sync word is synchronized to the MTC in the base station, and the transmitting and receiving clocks at the base station and the handset are synchronized to the received sync word. After delaying a fixed number of bits including guard interval plus a fixed slot waiting time (in TDMA). The slot waiting time must be an integer number of MTC periods. The remaining operations are the same as for the CDMA system described earlier.

The MTC rate is determined by the cell size, e.g. macro-cell or micro-cell, and the slot clock (for TDMA) or symbol clock (for CDMA) is a good choice for the MTC clock. For wireless systems, a guard interval is usually inserted to avoid the handset listening to itself or other handsets while receiving signals from the base station. Also, all the handset signals should arrive at the base station at a fixed time so that they do not interfere with each other while the base station is listening. Therefore, a guard interval must be inserted in the transition from a transmission (Tx) frame to a receiving (Rx) frame in time division duplex ("TDD") mode at the base station, but not necessary from Rx to Tx. The minimum guard interval is equal to the maximum delay between the handset and the base station including multi-path delay:

Guard interval (GI)>Maximum delay.

The end of the guard interval determines the arrival times of all handset signals when they are synchronized. In a frequency division duplex ("FDD") mode, GI can be set to zero.

After the initial delay measurement at the base station, the base station sends the delay value D to the handset. Handset synchronization begins with the handset delaying its pilot (or sync word) transmission by GI–2D. The base station, after receiving the new pilot, will send a new delay value to the handset for synchronization. Because the handset transmission is delayed by GI, the base station must subtract GI from the measured delay to obtain D. The base station continuously measures the delay for every handset and relays the delay value to the handset. The net result is a handset advances its transmission time by 2D, until finally all D values approach zero, then all the signals will be bit (for TDMA systems) or chip (for CDMA systems) synchronized at the base station. The accuracy of this synchronization is better than a bit or chip except in deep fading environment because bit or chip period is the maximum of the count period and this period is the resolution of the measurement.

Figure 2:
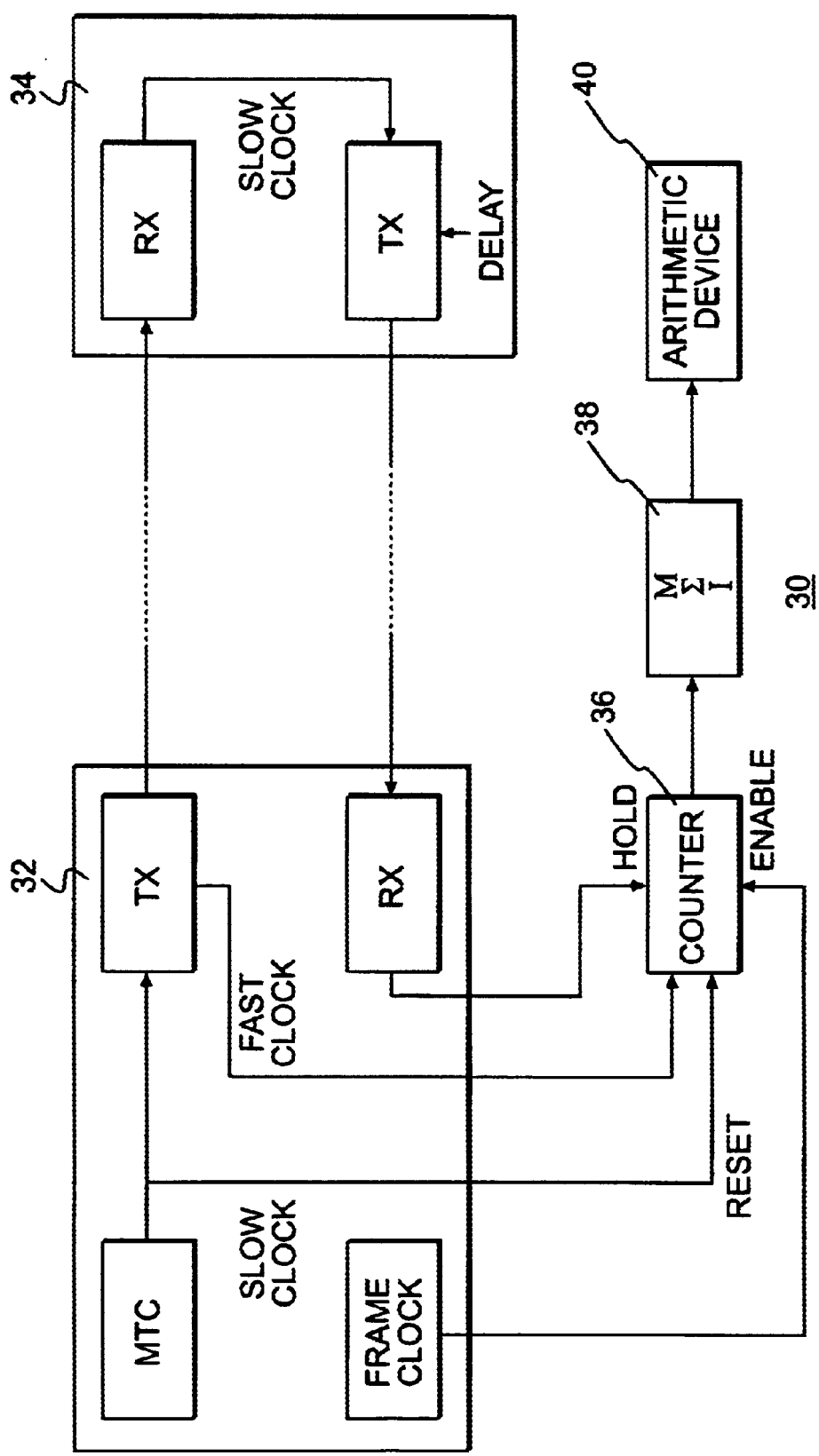
FIG. 2 is a block diagram showing one embodiment of the present invention in a wireless environment.

In an environment of fading and noise, a single measured delay may not be accurate although the DLL in the base station and the handset has built-in filters. In another embodiment of the present invention, the average value of many delay measurements is taken. This is shown in FIG. 2. A wireless communications system 30 includes a base station 32 and a handset 34. Base station 32 transmits a timing signal and simultaneously resets a counting clock in base station 32. Handset 34 receives a delayed timing signal and then transmits the delayed timing signal. Base station 32 receives a further delayed timing signal from handset 34 and simultaneously stops the counting clock. A counter 36 indicates the number of counts elapsed in the counting clock between the resetting and stopping, wherein each count of the counting clock equals the period of the counting clock. These steps are repeated M times to obtain M number of counts. A summer 38 adds these counts to obtain a sum. An arithmetic device 40 multiplies the sum with the period of the counting clock and divides the product by M to obtain an average delay. The average delay should be more reliable in multipath environments where the delay may be not unique.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of measuring signal delay between a first station and a second station in a communications system, wherein the distance between the first station and the second station is more than negligible, comprising:

transmitting a first signal from the first station to the second station and simultaneously resetting a counting clock in the first station, wherein simultaneously resetting said counting clock comprises providing a first clock to reset said counting clock, said first clock having a period equal to or greater than a delay between the first station and the second station;

receiving a delayed first signal at the second station;

transmitting said delayed first signal to the first station;

receiving a further delayed first signal at the first station and simultaneously stopping said counting clock;

calculating the number of counts elapsed in said counting clock between said resetting and said stopping of said counting clock, wherein each count of said counting clock equals the period of said counting clock; and multiplying said number of counts with the period of said counting clock.

2. The method as claimed in claim 1, further comprising dividing a product of said number of counts with the period of said counting clock by two to obtain the delay between the first station and the second station.

3. The method as claimed in claim 1, wherein the first station includes a first transceiver transmitting said first signal to the second station and providing said first clock signal to reset said counting clock.

4. The method as claimed in claim 3, further comprising said first transceiver providing said counting clock to a counter disposed in the first station.

5. The method as claimed in claim 1, wherein said simultaneously stopping said counting clock comprises providing a second clock to stop said counting clock, said second clock having a period equal to or greater than the delay between the first station and the second station.

6. The method as claimed in claim 5, further comprising receiving at a second transceiver, included in the first station, said further delayed first signal and providing said second clock signal to stop said counting clock.

7. The method as claimed in claim 1, further comprising receiving at a third transceiver, coupled to a fourth transceiver in the second station, said delayed first signal from the first station and said fourth transceiver transmitting said delayed first signal to the first station.

8. The method as claimed in claim 7, comprising providing said third transceiver at a negligible distance from said fourth transceiver.

9. The method as claimed in claims 8, comprising providing said third transceiver to include a receiver and said fourth transceiver to include a transmitter.

10. A method of measuring delay between a first interface pair and a second interface pair in a communications system, wherein the first interface pair includes a first interface and a second interface and the second interface pair includes a third interface and a fourth interface, and wherein the distance between the first interface pair and the second interface pair is more than negligible, comprising:

transmitting a first signal from the first interface and simultaneously providing a first clock to reset a counting clock, said first clock having a period equal to or longer than the delay between the first interface and the third interface;

receiving a delayed first signal at the third interface;

transmitting said delayed first signal from the fourth interface, wherein the distance between the third interface and the fourth interface is negligible;

receiving a further delayed first signal at the second interface, and simultaneously stopping said counting clock;

calculating the number of counts elapsed in said counting clock between said resetting and said stopping of said counting clock, wherein each count of said counting clock equals the period of said counting clock; and multiplying said number of counts with the period of said counting clock.

11. The method as claimed in claim 10, further comprising providing from the first interface said first clock signal to reset said counting clock.

12. The method as claimed in claim 10, wherein said simultaneously stopping said counting clock comprises providing a second clock to stop said counting clock, said second clock having a period equal to or longer than the delay between the second interface and the fourth interface.

13. The method as claimed in claim 10, further comprising providing from the second interface said second clock signal to stop said counting clock.

14. The method as claimed in claim 10, further comprising delay locking said delayed first signal to said first signal.

15. A method of synchronizing a handset to a base station in a wireless communications system, comprising:

transmitting a first signal from the base station and simultaneously resetting a counting clock in the base station by providing a first clock, said first clock having a period equal to or longer than a delay between the base station and the handset;

receiving a delayed first signal and recent delay value at the handset;

transmitting said delayed first signal from the handset at a time determined by a linear function of the delay value;

receiving a further delayed first signal at the base station and simultaneously stopping said counting clock;

calculating the number of counts elapsed in said counting clock between said resetting and said stopping of said counting clock, wherein each count of said counting clock equals the period of said counting clock; and multiplying said number of counts with the period of said counting clock.

16. The method as claimed in claim 15, further comprising, repeating a predetermined number of repetitions of said calculating of the number of counts and multiplying said number of counts;

adding the product of said multiplying of the number of counts for said predetermined number of repetitions to obtain a sum; and dividing said sum by said predetermined number of repetitions.

17. The method as claimed in claim 15, wherein said simultaneously stopping said counting clock comprises providing a second clock to stop said counting clock, said second clock having a period equal to or greater than the delay between the base station and the handset.

18. The method as claimed in claim 15, further comprising delay locking said delayed first signal to said first signal.

19. The method as claimed in claim 15, further comprising:

repeating said transmitting a first signal through said number of counts; and obtaining an average value of counts.

20. A method of synchronization in a wireless communications system, comprising:

transmitting a first signal from a base station to a handset and simultaneously resetting a counting clock in said base station, wherein simultaneously resetting said counting clock comprises providing a first clock to reset said counting clock, said first clock having a period equal to or longer than the delay between the base station and the handset;

receiving a delayed first signal and recent delay value at said handset;

transmitting said delayed first signal from said handset at a time determined by a linear function of the delay value;

receiving a further delayed first signal at said base station and simultaneously stopping said counting clock;

calculating a first number of counts elapsed in said counting clock between said resetting and said stopping of said counting clock, wherein each count of said counting clock equals the period of said counting clock;

repeating a predetermined number of times of said transmitting a first signal through said calculating to obtain a second nember of counts;

adding said first and second number of counts for each of said predetermined number of repetitions to obtain a sum;

multiplying said sum with the period of said counting clock; and dividing the product of said multiplying by the predetermined number of repetitions.

21. A method of synchronizing a first station with a second station in a communications system, wherein the distance between the first station and the second station is more than negligible, comprising:

providing a first interface in the first station, said first interface transmitting a first signal and simultaneously providing a first clock signal to reset a counting clock in the first station, said first clock signal having a period equal to or longer than the delay between the first station and the second station;

providing a second interface in the first station;

providing a third interface in the second station, said third interface receiving a delayed first signal and recent delay value and transmitting said delayed first signal at a time determined by a linear function of the delay value;

providing a fourth interface coupled to said third interface in the second station, said fourth interface receiving said delayed first signal and transmitting said delayed first signal, wherein the distance between said third interface and said fourth interface is negligible;

receiving a further delayed first signal at said second interface, and simultaneously stopping said counting clock;

providing a counter to determine the number of counts elapsed in said counting clock between said resetting and said stopping of said counting clock, wherein each count of said counter equals the period of said counting clock; and multiplying said number of counts with the period of said counting clock.

22. The method as claimed in claim 21, further comprising providing said second clock to have a period equal to or longer than the delay between the first station and the second station.

23. The method as claimed in claim 21, further comprising providing each of said first, second, third, and fourth interfaces as a U-transceiver.

24. The method as claimed in claim 21, further comprising coupling said first interface to said third interface and coupling said second interface to said fourth interface.

25. The method as claimed in claim 21, further comprising locating said first interface and said second interface in a central controller, and locating said third interface and said fourth interface in a base station.

26. The method as claimed in claim 21, further comprising locating said first interface and said second interface in a base station, and locating said third interface and said fourth interface in a handset.

27. The method as claimed in claim 26, further comprising inserting a guard interval between transmission and reception of signals at the first station wherein the guard interval in the wireless communications system is greater than the delay but less than the period of said first clock.

28. The method as claimed in claim 26, further comprising deleting a guard interval between transmission and reception of signals at the first station wherein the guard interval in the wireless communications system is greater than the delay but less than the period of said first clock.

29. The method as claimed in claim 21, further comprising providing said first interface and said third interface as a master-slave pair.

30. The method as claimed in claim 21, further comprising providing said fourth interface and said second interface as a master-slave pair.

31. A communications system, comprising:

a first station transmitting a first signal and resetting a counting clock in said first station;

a second station receiving a delayed first signal from said first station and transmitting said delayed first signal to said first station, said first station simultaneously stopping said counting clock upon receiving a further delayed first signal from said second station, wherein the distance between said first station and said second station is more than negligible, and wherein resetting said counting clock comprises providing a first clock to reset said counting clock, said first clock having a period equal to or greater than the delay between the first station and the second station;

a counter coupled to said first station to determine the number of counts elapsed in said counting clock between said resetting and said stopping of said counting clock, wherein each count of said counter equals the period of said counting clock; and arithmetic means coupled to said counter for multiplying said number of counts with the period of said counting clock.

32. The system as claimed in claim 31, wherein said first station is a base station and said second station is a handset.

33. The system as claimed in claim 31, wherein said first station is a central controller and said second station is a base station controller.

34. An apparatus for delay measurements, comprising:

a first interface pair including a first interface and a second interface, said first interface transmitting a first signal and simultaneously resetting a counting clock;

a second interface pair including a third interface and a fourth interface, said third interface receiving a delayed first signal from said first interface, and said fourth interface transmitting said delayed first signal to said second interface, wherein the distance between said third interface and said fourth interface is negligible, said second interface receiving a further delayed first signal and simultaneously stopping said counting clock, and wherein simultaneously resetting said counting clock comprises providing a first clock to reset said counting clock, said first clock having a period equal to or greater than the delay between said first interface and said third interface;

a counter coupled to said first interface pair to calculate the number of counts elapsed in said counting clock between said resetting and said stopping of said counting clock, wherein each count of said counting clock equals the period of said counting clock; and arithmetic means for multiplying said number of counts with the period of said counting clock.

* * * * *